Aug. 17, 1965
C. J. SAILE
3,201,686
CORONA TEST SET CALIBRATOR HAVING A MERCURY
WETTED RELAY SWITCH FOR PROVIDING A SQUARE
WAVE CALIBRATION SIGNAL
Filed April 18, 1962
2 Sheets-Sheet 1
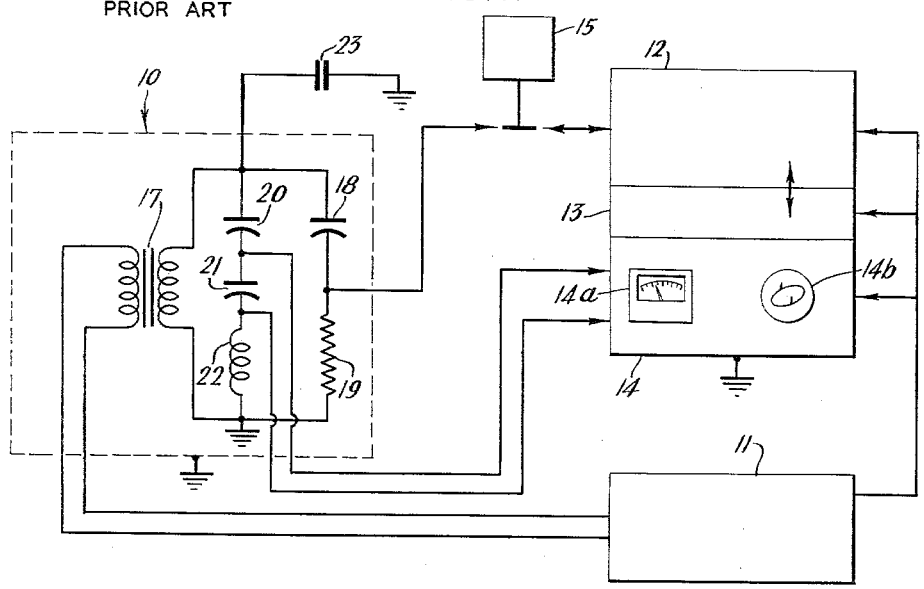
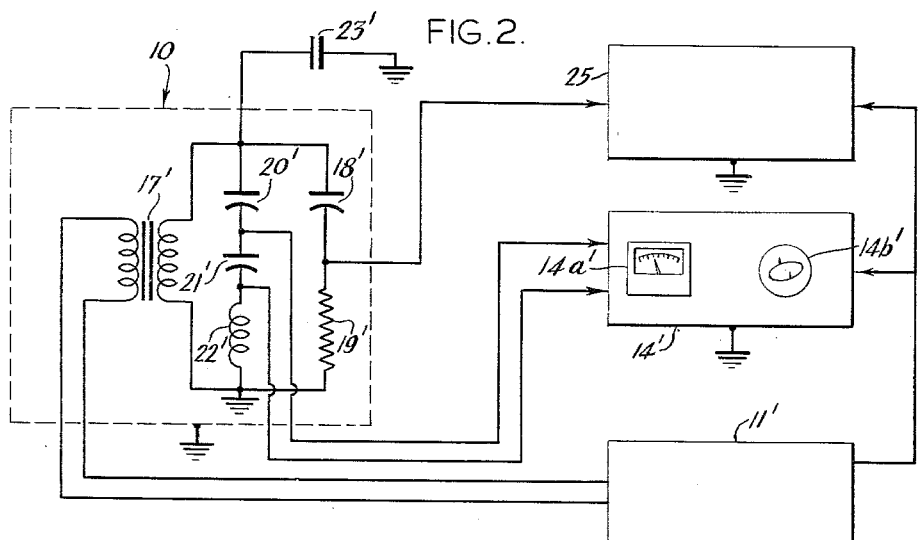
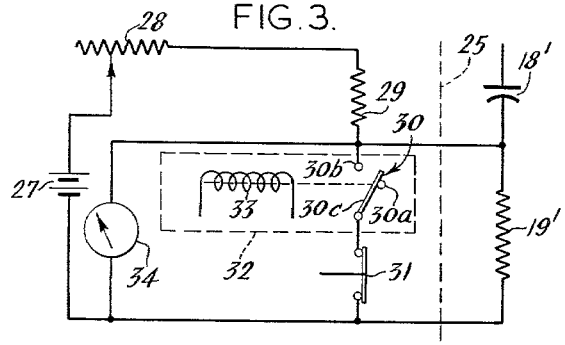
INVENTOR
CHARLES J. SAILE
BY Howson & Howson
ATTYS Aug. 17, 1965 C. J. SAILE 3,201,686
CORONA TEST SET CALIBRATOR HAVING A MERCURY
WETTED RELAY SWITCH FOR PROVIDING A SQUARE
WAVE CALIBRATION SIGNAL
Filed April 18, 1962 2 Sheets-Sheet 2
FIG. 4.
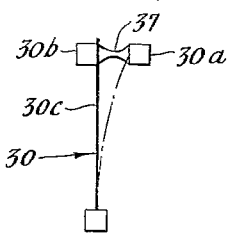
FIG. 5.
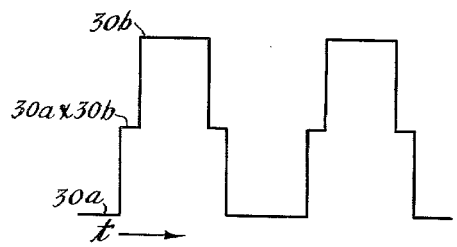
FIG. 6.
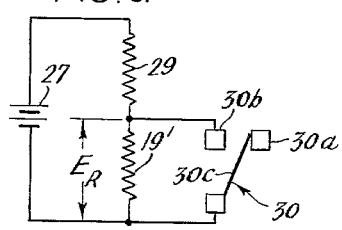
FIG. 7.
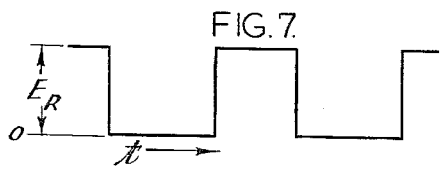
FIG. 8.a.
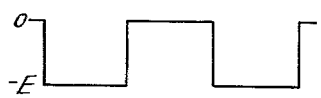
FIG. 8b.
FIG. 8c.
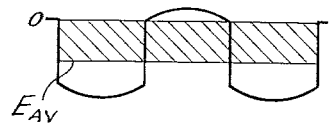
FIG. 9a.
FIG. 9b.
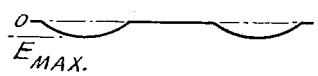
FIG. 9c.
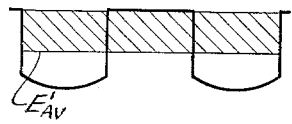
FIG. 9d.
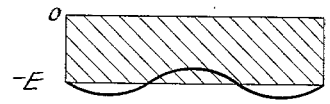
INVENTOR.
CHARLES J. SAILE
BY Howson & Howson
ATTYS.

United States Patent Office 3,201,686
Patented Aug. 17, 1965

3,201,686
CORONA TEST SET CALIBRATOR HAVING A MERCURY WETTED RELAY SWITCH FOR PROVIDING A SQUARE WAVE CALIBRATION SIGNAL
Charles J. Saile, Norristown, Pa., assignor to James G. Biddle Company, Philadelphia, Pa., a corporation of Pennsylvania
Filed Apr. 18, 1962, Ser. No. 188,387
5 Claims. (Cl. 324—54)

The present invention is directed to corona test set calibration and specifically to a system which enables calibration and determination of apparent corona charge by simplified yet highly accurate means.

In recent years testing for corona has been highly developed and test sets have been designed which detect the presence of corona discharge and measure the value of its apparent charge. Such a test set is described in the United States patent to W. P. Foster No. 2,948,849, assigned to the applicant's assignee. The test set described in that patent might be, and preferably is, employed in the system of the present invention, and the present invention preferably employs the method of that patent. The present invention involves no change in the test set per se but rather a change in the other apparatus of the system which must be used with the test set in order to achieve corona charge measurement.

In accordance with the teachings of Foster, comparison is made in the test set between a standard capacitor to which known voltage effects are applied, where preferably the capacitance of the standard is fixed and the voltage is variable, and a sample whose corona effect is to be determined under the effect of a known applied voltage. Corona discharges in the sample are detected by a high gain amplifier and displayed as pulses on the screen of a cathode ray oscilloscope. A voltage signal is applied across the known capacitance which will produce a pulse essentially like that produced by the sample. The signal across the known capacitance is preferably produced by a signal generator, the amplitude of whose signal can be adjusted. Because the size of the standard capacitor and the size of the signal at a given time is known, when the amplitude of the signal produced by the signal generator equals the ampiltude of the signal produced by corona on the sample, the size of the corona effect is thereby known, as demonstrated by Foster.

In the prior art the signal generator has commonly been a square wave generator or similar device. Such devices have no inherent synchronization with the test voltage so that a pulse on the display of the oscilloscope would tend to constantly rotate along its characteristic elliptical trace. To make the pulse appear stationary on the trace a synchronizing voltage having a frequency (usually 60 cycles) corresponding to that producing the trace had to be introduced. In order to position the pulse in a particular position on the trace once it had been stopped by synchronization a phase shifting network was required.

In accordance with the present invention a new type of calibrator is provided differing from the square wave signal generator of the prior art. The amplitude measurements in this case need not be measured by a highly expensive piece of equipment such as a vacuum tube voltmeter but can be made by a simple inexpensive direct current meter. Moreover this is done without loss of accuracy and without any concurrent measurement of a portion of the test set test voltage. The calibrator by the simple use of a common power supply with the test set and the corona detecting equipment is automatically phase adjusted with respect to the corona signal. This arrangemnet therefore provides a greatly simplified test system and results in material savings in the cost of equipment.

For a better understanding of the present invention reference is made to the drawings in which:

FIG. 1 shows schematically a system according to the prior art;

FIG. 2 shows a modified system according to the present invention;

FIG. 3 is an enlarged circuit diagram of the calibrator employed with the system of FIG. 2;

FIG. 4 schematically represents the action of a make-before-break mercury switch;

FIG. 5 is a representation of the operating characteristic with respect to time of the switch of FIG. 4;

FIG. 6 is a simplified schematic diagram representing the calibrator of FIG. 3;

FIG. 7 is a diagram representing the voltage output of the circuit of FIG. 6 on the same time scale as FIG. 5;

FIG. 8a illustrates the output of the conventional square wave generator of FIG. 1;

FIG. 8b represents the test voltage appearing across the calibrating resistor in FIG. 1;

FIG. 8c is a composite diagram of the voltages of FIGS. 8a and 8b as they appear across the calibrating resistor of FIG. 1 together with the composite average value of these voltages;

FIG. 9a is a diagram of the voltage output of the calibrator of FIG. 2;

FIG. 9b represents the test voltage appearing across the calibrating resistor in FIG. 2;

FIG. 9c is the composite diagram of the voltages of FIGS. 9a and 9b as they appear across the calibrating resistor in FIG. 2 together with the composite average value of the voltages; and FIG. 9d is voltage appearing across the calibrating resistor with the calibrator contacts open together with the composite average value of the voltages.

Referring first to FIG. 1 the test set is located within the dashed line enclosure and generally designated 10. The test set receives its energization from a power supply 11 which preferably supplies a regulated voltage at 60 cycle alternating current. The power supply also supplies power to the square wave generator 12, the synchronizing and phasing network 13 and the corona detector amplifier and voltmeter 14. The output of the square wave generator 12 to the test set is monitored by the rectifier type vacuum tube voltmeter 15, a high impedance alternating current device which must ascertain the voltage ampliude of the square wave but not distort the square wave in any way. Within the test set 10 are parallel circuits connected to the secondary of transformer 17. One branch is composed of calibrating capacitor 18 and a calibrating impedance 19 providing matching terminating impedance. Another parallel branch is a power separation filter composed of capacitors 20 and 21 and inductance 22. Connection is made from the square wave generator to the junction between the calibrating capacitor 18 and the terminating resistor 19 so that the signal is effective applied across the resistor. Connection is made to the voltmeter and oscilloscope constituting the voltage amplitude measurement and corona detector 14 by lines between capacitors 20 and 21 between capacitor 21 and inductor 22, respectively. The sample 23 is connected externally of the test set between the high voltage terminal of the secondary of transformer 17 and ground. The transformer, test set and other equipment are all preefrably grounded and employ ground as a return conductor.

In operation when corona occurs at specimen 23 a transient output voltage is reflected back through the power separation filter and a pulse occurs at the inductance 22 the amplitude and the phase of which may be determined on the oscilloscope 14b of the voltage amplitude measurement and corona detector equipment. Voltmeter 14a is employed to measure the test voltage across the secondary of transformer 17. A pulse produced by the square wave generator 12 acting across the known capacitance of the calibrating capacitor 18 produces a similar pulse across inductance 22 which will ordinarily be out of phase with the corona pulse. The amplitude of the pulse produced by the square wave generator and standard capacitor can then be adjusted by adjustment of square wave amplitude until it is the same as the amplitude of the pulse produced by the specimen of unknown size. Then, by virtue of known information, i.e., test set voltage, the amplitude of the voltage pulse, the size of the capacitor 18, and the size of the voltage applied to the specimen 23, the size of the signal originating in the specimen may be determined by the method and the calculations disclosed in the Foster Patent No. 2,948,849. The amplitude of the pulses can be compared visually on the oscilloscope. The pulse from standard, unless synchronized, will not necessarily remain in place, and in order to assure that there is no slippage of one pulse with respect to the other, the synchronizing system 13 is employed and supplied by the same power supply 11 as the test voltage. This system also permits phase adjustment of relative position of the standard pulse with respect to the corona pulse on the loop. The pulse produced by the specimen is stationary, so that it is only necessary to adjust the synchronizing and the phasing network until the second pulse remains stationary with respect to the first. Unfortunately, the synchronizing and phasing panel is an expensive piece of equipment as is the rectifier type vacuum tube voltmeter 15.

The present invention eliminates the need for the rectifier type vacuum tube voltmeter and the synchronizing and phasing panel by replacing the square wave generator with a calibrator 25. Except for the elimination of this equipment other components of the system remain essentially the same except the square wave generator. A net saving in cost is made simply by the elimination of equipment and there is a further saving in cost by use of an inexpensive calibrator in place of a more expensive square wave generator and vacuum tube voltmeter. In FIG. 2 elements corresponding to those in FIG. 1 are designated by similar number designators with the addition of primes to the number designators employed in FIG. 1.

In order to understand FIG. 2 the nature of the calibrator of FIG. 2 must be understood. A preferred embodiment of the calibrator is shown in FIG. 3 together with its connection to standard capacitor 18′ and terminating resistor 19′.

The calibrator has its own direct current power source 27. A series potentiometer 28 is used to vary the output current from the power source. Current limiting resistor 29 is in series with the power source 27 and together with resistor 28 limits the amount of current flowing from the power source when resistor 19′ is short circuited. Resistor 19′ is short circuited when switches 30 and 31 in a parallel circuit are both closed. Switch 31 is a control switch which when opened renders the complete switch 32 ineffective and when closed permits the action of switch 30 to produce an essentially square wave signal. Switch 30 is preferably a make-before-break mercury wetted switch, for example, of the Hg type manufactured by C. P. Clare & Co. The complete switch 32 consists of a pair of fixed contacts 30a and 30b and a movable contact 30c. The movable contact preferably being supported on a magnetic armature which responds to coil 33 to change the position of movable contact 30c from a position against contact 30a to a position against contact 30b. In practice the switch is usually enclosed within a glass envelope and is provided with contacts readily wetted with mercury with the armature in a pool of mercury which tends to flow up the armature and over the movable contacts. The coil 33 which surrounds the envelope is preferably connected to the same power supply as the test set 10 and therefore produces a switching action of the same frequency as the supply locked into synchronism therewith in a fixed phase relationship as the alternating current causes the switch to open and close once each cycle. For this reason no synchronizing and phasing network is required with this system.

FIG. 4 is a highly schematic representation of the make-before-break action of the switch. As seen in this diagram when the contact 30c moves to the dashed line position against contact 30a it pulls along with it from contact 30b a quantity of liquid mercury which maintains the connection to contact 30b even for a short period after the movable contact is against contact 30a until the mercury link breaks. The same effect is present also when the movable contact 30c moves back against contact 30b. This results in a time when contacts 30a and 30b are both connected to contact 30c. The action of a cyclically switched switch of this type may be seen by the diagram of FIG. 5 in which switch contact position is plotted against time $t$ on the horizontal axis. If the lowest level on the vertical axis represents time when contact 30c is against contact 30a alone, the uppermost level represents time when contact 30c is against contact 30b and the intermediate level represents the condition when all three contacts are connected by the mercury link.

FIG. 6 shows the switch of FIG. 4 in a simplified circuit representing the calibrator of FIG. 3. The voltage $E_r$ is developed across calibrating resistor 19′ when switch 30 is open as shown, but when closed the voltage drops to zero. This is shown in FIG. 7 wherein voltage is plotted against a time base $t$ corresponding to that of FIG. 5. As long as contact 30b is connected to contact 30c, the switch effectively short circuits resistor 19′ and eliminates any voltage drop across it.

When switch 30 is opened the voltage which appears across it is recorded on voltmeter 34 which in practice may be a D.C. microammeter calibrated in millivolts. When switches 30 and/or 31 are open the voltage which appears across it is indicated on the voltmeter. The peak value of the calibrating signal is indicated only, even though there is superimposed upon it a portion of the test voltage (as determined by the ratio of impedance of 18 and 19). This is due to the inherent characteristic of a direct current instrument that the average value over a complete cycle of a sine wave is zero. This is different from a rectifier type instrument which was used in the previous art.

FIGS. 8a, 8b and 8c show voltage-time diagrams of the voltage experienced in the prior art system of FIG. 1. FIG. 8a is the output from the square wave generator which is set at maximum amplitude of $-E$. FIG. 8b is is representative of the portion of the test voltage, an alternating voltage of sinusoidal form having a maximum, $E_{max}$, appearing across calibrating resistor 19. As a result of this the vacuum tube voltmeter will be subjected to a combined voltage illustrated in FIG. 8c and the meter will read an average value $E_{av}$ equal to the sum of $E/2$ and $2E_{max}/\pi$.

The calibrator of FIGS. 2 and 3 presents the typical voltage-time curves of FIGS. 9a, 9b, 9c and 9d. FIG. 9a is the output of the calibrator with the switch 31 closed and switch 30 operating. FIG. 9b corresponds to FIG. 8b and represents the portion of test voltage across resistor 19′. FIG. 9c combines these two voltages and the direct current meter 34 reads an average voltage $E'_{av}$ equal to $E/2$ plus $E_{max}/\pi$. Should the calibrator switch contacts 30 or 31 remain open the average voltage becomes the steady state E as shown in FIG. 9d. On the other hand were the switches both left closed $E'_{av}$ would be zero.

Thus, by means of a very simple inexpensive meter 34 the amplitude of the voltage applied to calibrating resistor 19′ can be determined with no need to employ a vacuum tube voltmeter. Moreover, since the voltage from power supply 11 supplies coil 33, the frequency and phase of the calibrating pulse is always the same with respect to the calibrating pulse even without the use of a synchronizing and phasing network.

An important advantage of mercury wetted make-before-break type of switch is that a uniform characteristic is obtained without any danger of chatter as the movable contact moves from one contact to the other. Once the movable contact moves against a particular fixed contact, any tendency for slight mechanical movements relative thereto is damped out by the mercury which also maintains actual contact in the course of any mechanical oscillations.

Various modifications can be made in accordance with the teaching of the present invention. All such modifications within the terms of the claims are intended to be within the scope and spirit of the present invention.

I claim:

1. A corona test set comprising a transformer; a standard capacitance and calibrating resistor connected in series across the transformer secondary; terminals for connecting a sample which comprises a dielectric material across the transformer secondary; terminals adapted to connect a power supply across the transformer primary; a power separation filter across the transformer secondary; means for detecting and measuring a first signal received at the power separation filter indicative of corona signal across the sample and for detecting and measuring a second signal received at the power separation filter indicative of a calibration signal similar to the corona signal introduced through the standard capacitance; and a calibrator for applying said calibration signal in the form of a square wave to the standard capacitance across the calibrating resistor including a direct current source, a mercury wetted relay switch in parallel with the calibrating resistor across the direct current source, means for opening and closing the switch at a high frequency, a direct current meter in parallel with the calibrating resistor and switch to measure the voltage amplitude.

2. The corona test set of claim 1 in which said switch is operated at the frequency of the test set power supply.

3. The corona test set of claim 2 in which the transformer and means for operating the switch are provided with a common power supply.

4. A corona test set comprising a transformer; a standard capacitance and calibrating resistor connected in series across the transformer secondary; terminals for connecting a sample which comprises a dielectric material across the transformer secondary; terminals adapted to connect a power supply across the transformer primary; a power separation filter across the transformer secondary; means for detecting and measuring a first signal received at the power separation filter indicative of corona signal across the sample and for detecting and measuring a second signal received at the power separation filter indicative of a calibration signal similar to the corona signal introduced through the standard capacitance; and a calibrator for applying said calibration signal in the form of a square wave to the standard capacitance across the calibrating resistor including a direct current source, a mercury wetted make-before-break switch in parallel with the calibrating resistor across the direct current source, means for opening and closing the switch at the frequency of the test set power supply and a direct current meter in parallel with the calibrating resistor and switch to measure voltage amplitude.

5. The corona test set of claim 4 in which the transformer and the means for operating the switch are provided with a common power supply.

References Cited by the Examiner

UNITED STATES PATENTS

| | | | |
|---|---|---|---|
| 1,337,737 | 4/20 | Van Der Bijl | 307—132 X |
| 2,773,946 | 12/56 | Greenberg et al. | 321—49 X |
| 2,948,849 | 8/60 | Foster | 324—54 |
| 3,017,561 | 1/62 | Williams | 321—47 X |

WALTER L. CARLSON, *Primary Examiner.*